Oct. 8, 1935.    H. P. THOMAS    2,016,978

ELECTRIC GAUGE

Filed Dec. 1, 1931

Inventor:
Henry P. Thomas,
by Charles E. Tullar
His Attorney.

Patented Oct. 8, 1935

2,016,978

UNITED STATES PATENT OFFICE 2,016,978

ELECTRIC GAUGE

Henry P. Thomas, Schenectady, N. Y., assignor to General Electric Company, a corporation of New York Application December 1, 1931, Serial No. 578,407

15 Claims. (Cl. 177—351)

This invention relates to measuring devices, more particularly to devices for determining a dimension of an article, and it has for an object the provision of a simple, reliable and improved device of this character.

More specifically the invention relates to electric gauges of the comparator type employed for rapidly and accurately gauging and rejecting from machined parts produced in quantity lots, those parts which exceed a predetermined tolerance as to over-size or under-size, and a further object of the invention is the provision of a gauge of this character which is extremely accurate and which can be rapidly manipulated.

In carrying the invention into effect in one form thereof the movement of the gauging member into contact with the article to be gauged is caused to vary the wave form of the voltage of an alternating current circuit, and indicating means are provided which respond to the variation of the voltage wave form.

More specifically a permeable magnetic vane or armature is arranged in the air gap of a small magnet and is magnetized by the alternating flux of a coil connected to a circuit supplied with a symmetrical alternating voltage wave. The movement of the gauge member or spindle from a predetermined zero position effects a corresponding movement of the magnetic vane, as a result of which the voltage wave of the circuit is so distorted that it is unsymmetrical on opposite sides of its zero axis. A non-linear resistance is included in the circuit and this has a rectifying action when the two halves of the voltage wave are unsymmetrical, thereby producing a component of direct current proportional to the movement of the vane as well as the linear reading on an indicating direct current instrument connected to the circuit. When the gauging member and magnetic vane are in their zero positions, both half cycles of the voltage wave are symmetrical and the indicating instrument reads zero. An important advantage of the invention is that the scale readings of the indicating instrument are practically independent of the supply voltage over a wide range of values.

Certain features of the present invention are described and broadly claimed in an application of Henry P. Thomas entitled Direction responsive system, Serial No. 578,406, filed December 1, 1931, and assigned to the same assignee as the assignee of the present invention.

Figure 1:
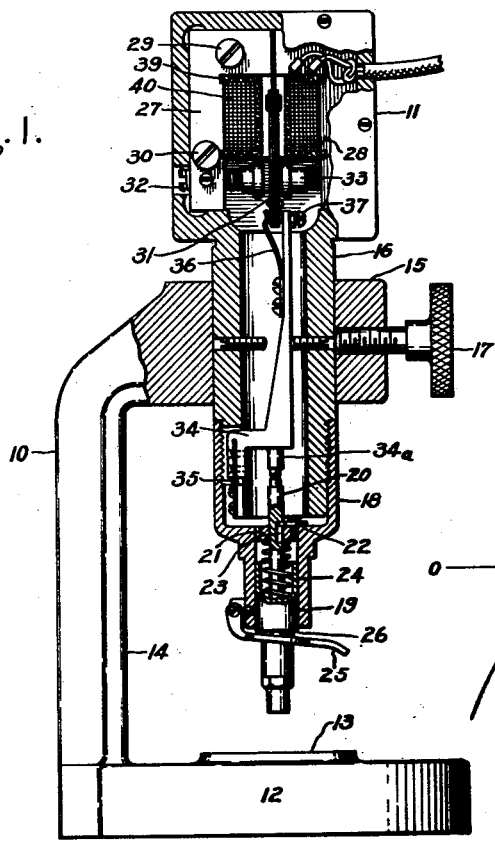
Figure 3:
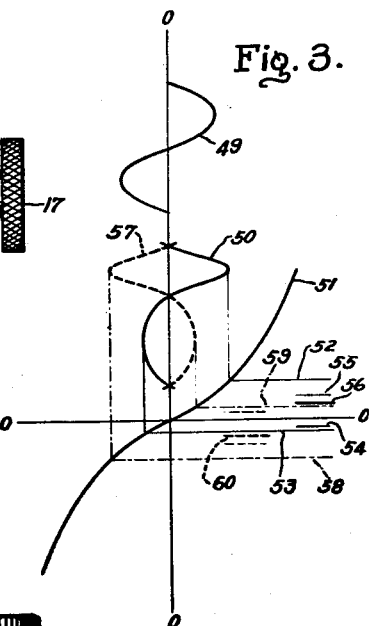
Figure 2:
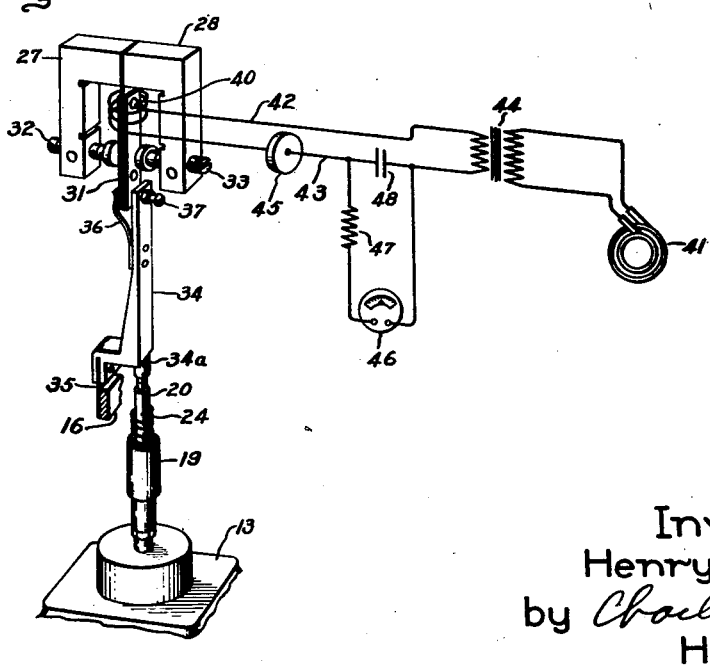

For a better and more complete understanding of the invention reference should now be had to the following specification and to the accompanying drawing in which Fig. 1 is a side view of the gauge with parts broken away to reveal the structure and operation of the working parts; Fig. 2 is a simple diagrammatical illustration of certain working parts of the gauge and the cooperating electric circuit and Fig. 3 is a chart of circuit characteristics explanatory of the operation of the gauge.

Referring now to the drawing, the invention is illustrated in one form thereof as comprising a gauge stand 10 and a gauge head 11. The gauge stand 10 has a bed plate 12, the upper surface of which is provided with a raised portion or anvil 13 upon which the work which is to be gauged is placed for the gauging operation. A vertical extending arm 14, which is preferably formed integrally with the bed plate 12, is provided with an overhanging portion 15 in which the downwardly extending shank or nose 16 of the gauge is slidably mounted for vertical movement. The overhanging portion 15 of the arm is provided with a set screw 17, which when screwed into engagement with the shank 16 serves to clamp the head in any desired vertical position. The lower extremity of the nose 16 is threaded to receive the enlarged upper threaded portion of a sleeve 18 in the lower constricted hollowed portion of which the gauging member or spindle 19 is arranged for vertical movement. As shown in the drawing, the upper portion of the spindle 19 is hollowed and is provided with a vertical member 20 which extends upwardly into the hollowed interior of the shank 16. A washer 21 threaded into the interior wall of the upper part of the constricted portion of the sleeve 18 serves to guide the vertical motion of the member 20 whilst a stop 22 which cooperates with the slot 23 in the member 20 serves to limit the vertical movement of the gauging member 19 to an amount determined by the length of the slot.

The gauging member 19 is normally actuated to its lowermost position with the stop 22 against the upper extremity of the slot 23 by means of a spiral spring 24 which surounds the member 20 and is arranged between the washer 21 and the gauging member 19 so that it exerts force in a downwardly direction.

In order that the gauging member 19 may be raised to admit the piece which is to be gauged, a manually operated lever 25 is pivotally secured to the lower extremity of the constricted portion of the sleeve member 18 and bears against a downwardly projecting shoulder 26 with which the gauging member 19 is provided so that the latter is actuated in an upward direction against the force of the spring 24 when the lever member 25 is raised by the operator.

In the upper portion of the head 11 there is provided a small permanent magnet constructed in two L-shaped portions 27 and 28 respectively which are secured to the housing of the head by any suitable fastening means, such for example as the screws 29 and 30. Although the magnet may be made of any suitable material, it is preferably constructed of some light-weight material having a high degree of coercive force and retentivity, such for example as cobalt steel. It will be observed that the two L-shaped magnetic members 27 and 28 are arranged in the head in such a manner that they form a single inverted U-shaped or horse shoe magnet with an air gap between the poles of the vertical legs thereof.

An armature constructed in the form of a magnetic vane 31 is arranged in the central position in the air-gap between the poles of the vertical legs of the magnet and is pivotally secured in the yoke between the abutting portions of the magnetic members 27 and 28 for movement in either direction from this central position. Although the magnetic vane member 31 may be made of any suitable material, it is preferably made of a material having high permeability and low coercive force such for example as nickel-iron alloy having a nickel content of approximately 78½% and an iron content of approximately 21½% and sold on the market under the name of Permaloy. When the magnetic vane 31 occupies the exact central position between the poles of the magnets in which it is illustrated in Fig. 1 of the drawing, none of the magnetic flux due to the magnet traverses the vane in a vertical longitudinal direction, but on the contrary all of the flux passes from one pole of the magnet to the other. In order that the sensitivity of the gauge may be adjusted to any desired degree, the extremities of the vertical legs of the magnet are provided with adjustable screws 32 and 33 made of a permeable magnetic material and which may be advanced or retracted to adjust the air gap of the magnet to any desired length.

The vertical motion of the contacting member 19 is translated into horizontal motion of the armature member 31 by means of an L-shaped lever arm 34 the horizontal arm of which is provided with a downwardly projecting lug 34ª, which contacts with the upper extremity of the member 20 and is pivotally secured to the lower extremity of the nose 16 by any suitable resilient means such for example as the leaf spring 35; the upper extremity of the vertical arm of the lever 34 being secured to the lower extremity of the armature 31 by any suitable fastening means such for example as the clip spring 36 and the set screw 37. The set screw 37 also provides for initial adjustment of the gauge and preferably this initial adjustment is so made that the armature member 31 occupies the central position illustrated when the stop member 22 occupies a position midway between the extremities of the slot 23.

As shown in the drawing, the vertical legs of the magnet are recessed to receive a spool 39 upon which a detector coil 40 is wound. The spool is of such a dimension that it occupies the space above the sensitivity adjusting screws 32 and 33 and it is hollowed sufficiently to admit the magnetic vane 31 and to provide for its lateral movement. The coil 40 is supplied with a symmetrical alternating voltage from any suitable source, such for example as that represented in the drawing by the alternating current generator 41 to which it is connected by the electric circuit comprising the conductors 42 and 43 through the input transformer 44. It will be understood, of course, that the alternating current generator 41 in this drawing is merely representative of any suitable alternating current source and that the gauge may be and preferably is supplied from the shop supply of the building or laboratory in which the gauge is being used. As thus constructed, the detector coil 40 and the magnetic vane 31 constitute a reactance device of which the vane 31 forms the core and the detector coil forms the reactive winding. The core 31 is magnetized to a predetermined value, preferably beyond the saturation point of the material, in opposite directions by the alternating current flux due to the winding 40.

A non-linear resistance device 45, i. e. a resistance, the current through which is not directly proportional to the impressed voltage, is included in series relationship in the circuit between the secondary winding of the transformer 44 and the reactive winding 40. This non-linear resistance may be made of any suitable material having a non-linear characteristic but is preferably made of a composition of silicon carbide crystals which are held together by any suitable binder. Resistance material of this character is sold on the market under the trade name Thyrite and is described and claimed in U. S. Patent 1,822,742—Karl B. McEachron, dated September 8, 1931.

An indicating instrument 46 conventionally represented in the drawing as a direct current micro-ammeter having a zero center scale is connected in the circuit between the non-linear resistance 45 and the secondary winding of the input transformer 44; a suitable high impedance choke coil 47 being included in the meter lead. Alternating current or alternating current components are prevented from passing through the coils of the meter 46 by means of a suitable by-pass condenser 48 connected across the meter terminals in the manner illustrated in Fig. 2 of the drawing.

With the above understanding of the elements and their organization in the completed system, the operation of the gauge will readily be understood from the detailed description which follows:

As previously pointed out the magnetic vane 31 is initially adjusted to occupy the central position in which it is illustrated in Fig. 1 when the stop member 22 occupies a mid-position between the extremities of the slot 23. When the vane 31 occupies this central position between the poles of the permanent magnet, the flux of the latter does not traverse the vane in a longitudinal direction and consequently the vane is magnetized only by the alternating current flux due to the winding 40. The shape of the voltage wave impressed upon the circuit including the non-linear resistance 45 and the reactive winding 40 is perfectly symmetrical about the zero axis as represented by the sinusoidal curve 49 in Fig. 3 of the drawing. Likewise the wave shape of the alternating current flowing in the circuit is perfectly symmetrical and as a result the direct current indicating instrument 46 reads zero. Assuming now that it is desired to gauge articles to the exact dimensions of two inches, a suitable two inch standard, such for example as a Johanssen gauge block is placed upon the anvil 13 and the set screw 17 is loosened and the head 11 lowered until the work contacting member engages the standard. If the indicating instrument does not read exactly zero, final vertical adjustment of the head with the work contacting member 19 maintained in engagement with the standard is made until the instrument reads zero and the set screw 17 is then tightened to clamp it in this position. The standard is now removed from the anvil and the gauge is ready for the gauging operation.

To gauge the article the operator presses upwardly upon the manually operated lever 25 to raise the gauging spindle 19 so as to admit the article which is to be gauged upon the anvil. The operator then releases the lever 25 and the spring 24 forces the spindle 19 downwardly into engagement with the article.

If the dimension of the article is exactly two inches, the magnetic vane 31 will occupy the exact central position between the poles of the magnet, and as previously pointed out, when this condition obtains the indicating instrument 46 reads zero. The zero reading, therefore, indicates to the operator that the dimension of the article is exactly two inches. However, if the dimension of the article is under two inches by a slight amount, for example, one ten-thousandth of an inch, the magnetic vane 31 will be actuated by the lever 34 in a right-hand direction from its central position so that it is closer to the right-hand pole of the magnet than to the left-hand pole thereof. As a result, some of the magnetic flux of the magnet traverses the vane in a longitudinal direction and since this steady direct flux is superimposed upon the alternating flux due to the winding 40, saturation is reached sooner on one-half cycle of the voltage than on the succeeding half-cycle and as a result the wave shape of the circuit voltage is no longer symmetrical upon both sides of the zero axis but, on the contrary, is rendered unsymmetrical in the manner represented by the curve 50 in Fig. 3 of the drawing. It will be observed that the right-hand or positive half-cycle of this wave is steeply peaked whilst the left-hand or negative portion is noticeably flattened. Both half-cycles, however, have the same area and in the absence of the nonlinear resistance 45 in the circuit the indicating instrument would still read zero. The relationship between the current flowing through the non-linear resistance 45 and the voltage impressed thereon is represented by the curve 51, and it will be seen that the current through the resistance increases approximately with cube of the voltage.

By projecting the maximum positive value of the voltage wave 50 upon the current wave 51, it will be observed that a current of a positive maximum value represented by the horizontal line 52 is caused to flow in the circuit during the positive half-cycle of the voltage and that by projecting the maximum negative value of the voltage wave 50 upon the curve 51 a negative current the maximum value of which is represented by the horizontal line 53, is caused to flow in the circuit during the negative half cycle. The total resultant current wave is still alternating but by subtracting the average negative value represented by the line 54 from the average positive value represented by the line 55, it will be seen that this resultant current has a positive direct current component the value of which is represented by the horizontal line 56. Since a direct current cannot flow through the by-pass condenser 48, this direct current component passes through the indicating instrument 46 and the needle is deflected in a right-hand direction from its zero position to a position upon the scale which is calibrated in suitable units such, for example, as ten ten-thousandths of an inch, to indicate the divergence of the gauged article from the two inch standard.

The movement of the magnetic vane 31 from its central position is of course proportional to the amount of movement of the gauging spindle 19 and likewise the magnitude of the direct current component which influences the direct current microammeter 46 is proportional to the amount of movement of the magnetic vane 31.

If the dimension of the gauged article slightly exceeds the two inch standard, the magnetic vane 31 is actuated in the left-hand direction from its central position and as a result, the voltage wave of the circuit is again rendered unsymmetrical, but this time in the opposite sense, as represented by the dotted voltage curve 57, i. e. the left-hand or negative half-cycle of the voltage wave is peaked and the right-hand or positive half-cycle is flat; both half-cycles being of equal area however. By projecting the maximum values of the voltage wave 57 upon the current characteristic 51 in the manner previously described, it will be seen that during the negative half-cycle the maximum value of the current in the circuit is represented by the broken horizontal line 58 and during the positive half-cycle by the broken horizontal line 59, thus introducing into the circuit a current having a negative direct current component equal to the difference of the average value of these currents as represented in the drawing by the broken horizontal line 60. Since this direct current component is in the opposite direction from that previously described the needle of the meter 46 is deflected in the left-hand direction from its central or zero position by an amount proportional to the amount by which the dimension of the gauged article exceeds two inches.

It will be appreciated from the above description that the operation can be carried out very rapidly since all that is required of the operator is that he press the lever 25 in an upward direction, place the article to be gauged upon the anvil 13, then release the lever 25 and read the meter 46. If the meter gives a scale reading in either direction from the zero position, the operator understands that the article gauged is within the required tolerance as to oversize or undersize and will pass the article, whilst if the needle is deflected off scale the operator understands that the article does not come within the required tolerance and the article is accordingly rejected.

Although in accordance with the provisions of the patent statutes, I have described this invention as embodied in concrete form, it will be understood that the form described is merely illustrative and is not limited thereto since alterations and modifications will readily suggest themselves to persons skilled in the art without departing from the true spirit of this invention or the scope of the annexed claims.

What I claim as new and desire to secure by Letters Patent of the United States is:

1. A measuring device comprising a movable gauging member, an electric circuit, means for supplying a periodically varying voltage to said circuit, means responsive to movement of said member for effecting an unsymmetrical variation in wave form of said voltage, and indicating means responsive to said voltage variation.

2. A measuring device comprising a movable measuring member, a circuit supplied with a substantially symmetrical periodically varying voltage, means responsive to movement of said member for effecting an unsymmetrical variation in the wave form of the circuit voltage, a direct current indicating device, and means responsive to said voltage wave form variation for influencing said indicating device with a direct current.

3. An electric gauge comprising a movable gauging member, a circuit supplied with a symmetrical alternating voltage, means responsive to movement of said member for producing dissymmetry in the wave form of the circuit voltage, a direct current indicating device and rectifying means responsive to said dissymmetrical voltage for influencing said indicating device with direct current.

4. An electric gauge comprising a movable gauging member, a circuit supplied with an alternating voltage, reactive means having a magnetic member connected to said gauging member for movement therewith for effecting an unsymmetric variation in said voltage, a direct current indicating instrument and means comprising a non-linear resistance connected to said circuit for influencing said indicating instrument with a component of direct current.

5. An electric gauge comprising a movable work contacting member, an electric circuit supplied with an alternating voltage, means providing a magnetic field, a reactive means having a movable member, a connection between said members and means mounting said last mentioned member for movement in said field responsively to change of position of said contacting member for effecting an unsymmetrical variation in an operating condition of said circuit, a non-linear resistance responsive to said variation for producing a direct current component in said circuit, and a direct current indicating device responsive to said component.

6. An electric gauge comprising in combination a movable work contacting member, an electric circuit supplied with a substantially symmetrical alternating voltage, means providing a magnetic field, means for rendering the wave form of the circuit voltage unsymmetrical comprising a reactor having a core, a connection between said core and said member and means mounting said core for movement in said field responsively to change in position of said work contacting member and a winding on said core connected to said circuit, means comprising a non-linear resistance responsive to said unsymmetrical voltage for producing a direct current component in said circuit, and a direct current indicating device responsive to said direct current component.

7. In combination in an electric gauge, a movable work contacting member, an electric circuit, means for supplying an alternating voltage to said circuit, means providing a magnetic field, means for effecting an unsymmetrical variation in the circuit voltage proportional to a change in position of said work contacting member comprising a reactance device having a core and a magnetizing winding for said core connected to said circuit, a connection between said core and said member and means mounting said core for movement in said field responsively to movement of said member, means for producing a direct current component proportional to said variation in voltage comprising a non-linear resistance connected to said circuit, and a direct current ammeter responsive to said component.

8. In an electric gauge, the combination with a movable work contacting member, of an electric circuit supplied with an alternating voltage, a permanent magnet for producing a magnetic field, means for effecting variations in the symmetry of the wave form of the circuit voltage comprising a reactance device having a magnetic vane arranged in said field and movable in response to movement of said work contacting member and a winding connected to said circuit for magnetizing said vane, rectifying means responsive to said voltage wave form variation comprising a non-linear resistance included in said circuit, and direct current indicating means connected to said circuit.

9. In combination in an electric gauge, a movable work contacting member, an electric circuit supplied with an alternating voltage, means providing a magnetic field comprising a magnet having an air gap, means for effecting an increase in the maximum value of said voltage during one-half cycle and a decrease in the maximum voltage during the opposite half cycle proportional to a change in position of said work contacting member comprising a permeable magnetic vane pivotally mounted in said air gap, a connection between said vane and said member, and a winding cooperatively associated with said vane and connected to said circuit, rectifying means comprising a non-linear resistance for producing a component of direct current proportional to the magnitude of said variation in the maximum values of said circuit, and a direct current indicating device connected to said circuit.

10. In combination in an electric gauge, a gauge stand, a gauge head supported on said stand, an electric circuit supplied with an alternating voltage, a vertically movable work contacting member, a permanent magnet provided with an air gap mounted in said gauge head, means for effecting a variation in wave form of said voltage comprising a permeable magnetic vane pivotally mounted for movement in said air gap, and a reactive winding inductively associated with said vane and included in said circuit, a lever mounted in said head for effecting movement of said vane in said air gap responsively to vertical movement of said work contacting member, means responsive to said voltage wave form variation for producing a component of direct current comprising a non-linear resistance included in said circuit, and a direct current indicating device responsive to said direct current component.

11. An electric gauge comprising a movable work contacting member, an electric circuit supplied with an alternating voltage, means producing a steady magnetic field, a reactance device comprising a winding connected to said circuit and a core member magnetized by the alternating flux of said winding, means pivotally mounting said core member in such a position in said field that the flux of said field does not traverse said core, a connection between said core and said work contacting member providing movement of said core member into a position in which the flux of said field traverses said core responsively to a change in position of said work contacting member so that a variation is effected in the wave form of the circuit voltage, a direct current indicating device, and means responsive to said voltage variation comprising a non-linear resistance connected to said circuit for influencing said indicating device with direct current.

12. In combination in an electric gauge, a movable work contacting member, an electric circuit supplied with an alternating voltage, a permanent magnet provided with an air gap, means for effecting opposite variations in the symmetry of the wave form of said voltage comprising a reactance device having a winding connected to said circuit and a permeable core member, means pivotally mounting said core member in a central position in said air gap between the poles of said magnet and a connection between said core member and said work contacting member providing movement of said core member in opposite directions from said central position responsively to changes of said work contacting member in opposite directions from a predetermined position respectively, a direct current indicating instrument, and means comprising a non-linear resistance connected to said circuit and responsive to said opposite changes in symmetry of said voltage for influencing said indicating instrument with direct currents of opposite polarities respectively.

13. An electric gauge comprising in combination a gauge stand, a gauge head mounted on said stand, a movable gauging member mounted in said head, an electric circuit supplied with an alternating voltage, a permanent magnet provided with an air gap and mounted in said head, a reactance device comprising a winding connected to said circuit and a permeable magnetic vane core member, a connection between said gauging member and said vane, means pivotally mounting said vane in said air gap for movement about a central position between the poles of said magnet in response to movement of said gauging member, a non-linear resistance connected to said circuit for producing a direct current and a direct current indicating device connected to said circuit.

14. In combination in an electric gauge, a gauge head, a gauge stand for supporting said head, a movable gauging member mounted in said head, a permanent magnet provided with an air gap and mounted in said head, an electric circuit, means for supplying a symmetrical alternating voltage to said circuit, means for rendering the wave form of said voltage unsymmetrical comprising a reactance device having a magnetizing winding mounted in said head and included in said circuit and a permeable magnetic vane core member, a connection between said gauging member and said vane and means pivotally mounting said vane in said air gap in a central position between the poles of said magnet for movement about said central position responsively to a movement of said gauging member from a predetermined position, means comprising a non-linear resistance included in said circuit and responsive to said unsymmetrical voltage for producing a direct current component in said circuit, indicating means responsive to said direct current component comprising a microammeter connected to said circuit, and a condenser connected to said microammeter for by-passing the alternating current component.

15. An electric gauge comprising in combination a gauge head, a gauge stand supporting said head, a vertically movable gauging member mounted in said head, a permanent magnet provided with an air gap and mounted in said head, an electric circuit, means for supplying said circuit with a symmetrical alternating voltage, a reactance device having a winding mounted in said head and a core comprising a permeable magnetic vane pivotally mounted in said air gap for movement about a central position between the poles of said magnet for rendering the voltage wave of said circuit unsymmetrical about the zero axis by an amount proportional to the movement of said vane, a lever pivotally mounted in said head for moving said vane an amount proportional to the movement of said gauging member from a predetermined position, a non-linear resistance included in said circuit and responsive to said unsymmetrical voltage for producing a direct current component proportional to the amount of dissymmetry thereof, a direct current microammeter connected to said circuit, and means for adjusting the sensitivity of said gauge.

HENRY P. THOMAS.